United States Patent
Liang et al.

(10) Patent No.: US 10,408,923 B2
(45) Date of Patent: Sep. 10, 2019

(54) OPTICAL DESIGN FOR MODULARIZING LASER RADAR SENSOR

(71) Applicant: NATIONAL CHUNG SHAN INSTITUTE OF SCIENCE AND TECHNOLOGY, Taoyuan (TW)

(72) Inventors: Chao-Wen Liang, Taichung (TW); Li-Tsun Wang, Hsinchu (TW); Shih-Che Chien, Hsinchu (TW); Yu-Sung Hsiao, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 371 days.

(21) Appl. No.: 15/379,643

(22) Filed: Dec. 15, 2016

(65) Prior Publication Data
US 2018/0172803 A1    Jun. 21, 2018

(51) Int. Cl.
*G01S 7/481*    (2006.01)
*G02B 13/00*    (2006.01)

(52) U.S. Cl.
CPC .......... *G01S 7/4816* (2013.01); *G01S 7/4814* (2013.01); *G02B 13/002* (2013.01)

(58) Field of Classification Search
CPC ....... G01S 7/481; G01S 7/4814; G01S 7/4816
See application file for complete search history.

(56) References Cited

U.S. PATENT DOCUMENTS

| | | | | |
|---|---|---|---|---|
| 5,035,486 A | * | 7/1991 | Inokuchi | G02B 3/005 359/530 |
| 6,141,085 A | * | 10/2000 | Kato | G01S 7/481 180/169 |
| 8,761,594 B1 | * | 6/2014 | Gross | H04N 5/2256 396/155 |
| 2003/0042303 A1 | * | 3/2003 | Tsikos | G06K 7/10594 235/384 |
| 2004/0080938 A1 | * | 4/2004 | Holman | F21S 8/08 362/231 |
| 2007/0070507 A1 | * | 3/2007 | Yee | G02B 3/0018 359/622 |

(Continued)

FOREIGN PATENT DOCUMENTS

TW        200825943 A        6/2008

*Primary Examiner* — Eric L Bolda
(74) *Attorney, Agent, or Firm* — Schmeiser, Olsen & Watts, LLP

(57) ABSTRACT

A laser radar device comprises a laser projecting system and a laser radar detecting system. The laser projecting system comprises a laser diode; and a light source orientation adjustment unit comprising a collimating lens and a Powell lens to modulate the angle at which the first incident laser beam is projected onto an object. The laser radar detecting system comprises at least two laser radar detection units disposed in the horizontal direction and vertical direction of the object, respectively. The laser radar detection units each comprise a wedge-shaped lens, an aspherical lens system and an optical detector. By designing optical parameters of the wedge-shaped lens and stacking the laser radar detection units in the horizontal direction and vertical direction, it is feasible to facilitate overall device manufacturing and processing, meet R&D needs, and adjust an optical system in its entirety easily.

14 Claims, 5 Drawing Sheets

(56) References Cited

U.S. PATENT DOCUMENTS

| | | | | |
|---|---|---|---|---|
| 2008/0266544 A1* | 10/2008 | Wolf | ................ | G01S 7/4816 |
| | | | | 356/5.01 |
| 2011/0074659 A1* | 3/2011 | Park | ................ | G02F 1/0305 |
| | | | | 345/32 |
| 2012/0037794 A1* | 2/2012 | Lee | ................ | G01S 17/026 |
| | | | | 250/216 |
| 2014/0063491 A1* | 3/2014 | Smith | ................ | G01J 1/00 |
| | | | | 356/123 |

* cited by examiner

OPTICAL DESIGN FOR MODULARIZING LASER RADAR SENSOR

FIELD OF THE INVENTION

The present invention relates to a laser radar sensor and, more particularly, to optical design of a modular laser radar sensor.

BACKGROUND OF THE INVENTION

Due to rapid development of conventional smart transport systems, commercially available laser radar products abound. Nonetheless, the products are usually expensive, because high costs are incurred in manufacturing and adjusting their optical systems. For instance, the design of the field of view (FOV) of an optical detection system of a laser radar depends on overall system requirements. If the FOV of the laser radar system is designed to be 45°, then the lenses of its optical detection system must have an FOV of 45° in order to meet system requirements. As a result, every laser radar system design needs an optical detection system that matches its FOV, and in consequence the lenses of the optical detection system incur overly high costs in manufacturing and adjustment.

SUMMARY OF THE INVENTION

In view of the aforesaid drawbacks of the prior art, it is an objective of the present invention to provide an optical design for modularizing a laser radar optical system in a manner that employs one securing module as well as the stacking of a plurality of securing modules to attain an FOV which meets overall system requirements, reduce production and R&D costs, and facilitate adjustment of the overall optical system.

In order to achieve the above and other objectives, the present invention provides a laser radar detection unit, comprising: a wedge-shaped lens for receiving a first laser reflecting beam and emitting a second laser reflecting beam; an aspherical lens system for receiving the second laser reflecting beam and converting the second laser reflecting beam into a third laser reflecting beam by convergence; and an optical detector for detecting the third laser reflecting beam and converting the third laser reflecting beam into an electrical signal.

Regarding the laser radar detection unit, the wedge-shaped lens comprises: a light admitting surface for receiving the first laser reflecting beam; a light emitting surface opposite the light admitting surface and adapted to emit the second laser reflecting beam; a first lateral plane; and a second lateral plane having a smaller thickness than the first lateral plane, wherein lengthwise shape of the light admitting surface is asymmetrical about an optical axis of the wedge-shaped lens, and lengthwise shape of the light emitting surface is symmetrical about the optical axis of the wedge-shaped lens.

In order to achieve the above and other objectives, the present invention further provides a laser radar device, comprising: a laser projecting system for projecting a first incident laser beam onto an object; and a laser radar detecting system comprising at least two laser radar detection units disposed in a horizontal direction and a vertical direction of an object, respectively, wherein the laser radar detection units each comprise: a wedge-shaped lens for receiving a first laser reflecting beam reflected off the object and emitting a second laser reflecting beam; an aspherical lens system for receiving the second laser reflecting beam and converting the second laser reflecting beam into a third laser reflecting beam by convergence; and an optical detector for detecting the third laser reflecting beam and converting the third laser reflecting beam into an electrical signal.

Regarding the laser radar device, the laser projecting system comprises: a laser diode for emitting the first incident laser beam; and a light source orientation adjustment unit comprising a collimating lens and a Powell lens to modulate an angle at which the first incident laser beam is projected onto the object.

Regarding the laser radar device, the wedge-shaped lens comprises: a light admitting surface for receiving the first laser reflecting beam; a light emitting surface opposite the light admitting surface and adapted to emit the second laser reflecting beam; a first lateral plane; and a second lateral plane having a smaller thickness than the first lateral plane, wherein lengthwise shape of the light admitting surface is asymmetrical about an optical axis of the wedge-shaped lens, and lengthwise shape of the light emitting surface is symmetrical about the optical axis of the wedge-shaped lens.

Regarding the laser radar device, the wedge-shaped lens comprises: a light admitting surface for receiving the first laser reflecting beam; a light emitting surface opposite the light admitting surface and adapted to emit the second laser reflecting beam; a first lateral plane; and a second lateral plane having a smaller thickness than the first lateral plane, wherein lengthwise shape of the light admitting surface is asymmetrical about an optical axis of the wedge-shaped lens, and lengthwise shape of the light emitting surface is symmetrical about the optical axis of the wedge-shaped lens.

Regarding the laser radar device, the laser radar device further comprises a processing module for analyzing the electrical signal.

Regarding the laser radar device, the processing module is a computer.

Therefore, the laser radar device of the present invention is characterized by stacking laser radar detection units in the horizontal direction and vertical direction relative to an object, so as to meet the requirements of the laser radar device. Doing so not only facilitates the manufacturing, processing, and R&D of the device in its entirety, but also renders it easy to adjust the overall optical system.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figures 1A, 1B:
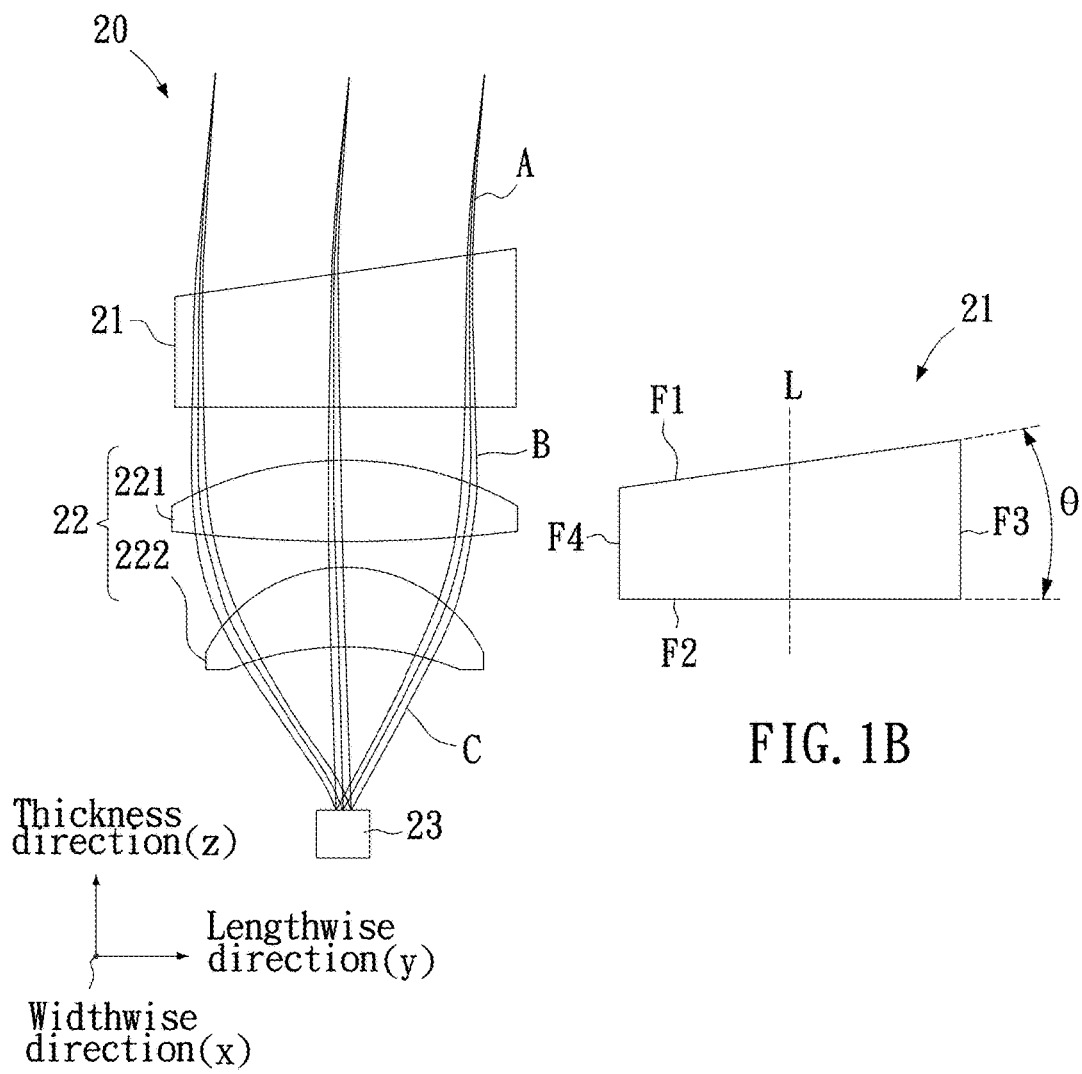
FIG. 1A is a schematic view of a laser radar detection unit according to an embodiment of the present invention.
FIG. 1B is a schematic view of a wedge-shaped lens according to an embodiment of the present invention.

Referring to FIG. 1A, there is shown a schematic view of a laser radar detection unit 20 according to an embodiment of the present invention. The laser radar detection unit 20 comprises a wedge-shaped lens 21, an aspherical lens system 22, and an optical detector 23. The wedge-shaped lens 21 receives a first laser reflecting beam A reflected off an object and emits a second laser reflecting beam B. The aspherical lens system 22 converts the second laser reflecting beam B into a third laser reflecting beam C by convergence and propagates the third laser reflecting beam C to the optical detector 23. The optical detector 23 converts the received third laser reflecting beam C into an electrical signal. The aspherical lens system 22 comprises a first aspherical lens 221 and a second aspherical lens 222. The quantity of the aspherical lens shown in FIG. 1A is illustrative, rather than restrictive, of a preferred embodiment of the present invention. In practice, the quantity of the aspherical lens is not limited to two but is subject to changes as needed.

Referring to FIG. 1B, there is shown a schematic view of the wedge-shaped lens 21 according to an embodiment of the present invention. As shown in the diagram, the wedge-shaped lens 21 has a light admitting surface F1, a light emitting surface F2, a first lateral plane F3, and a second lateral plane F4. The light admitting surface F1 receives the first laser reflecting beam A. The light emitting surface F2 is opposite the light admitting surface F1 and is adapted to emit the second laser reflecting beam B. The first lateral plane F3 has a larger thickness than the second lateral plane F4. Therefore, the shape of the light admitting surface F1 in lengthwise direction (y) is asymmetrical about an optical axis L of the wedge-shaped lens 21, whereas the shape of the light emitting surface F2 in lengthwise direction (y) is symmetrical about the optical axis L of the wedge-shaped lens 21. Since the light admitting surface F1 and the light emitting surface F2 together form an included angle θ there between, the included angle θ between the light admitting surface F1 and the light emitting surface F2 is designed to allow the light admitting surface F1 to receive laser reflecting beams with different FOV, which is one of the essential technical features of the present invention.

Figure 2:
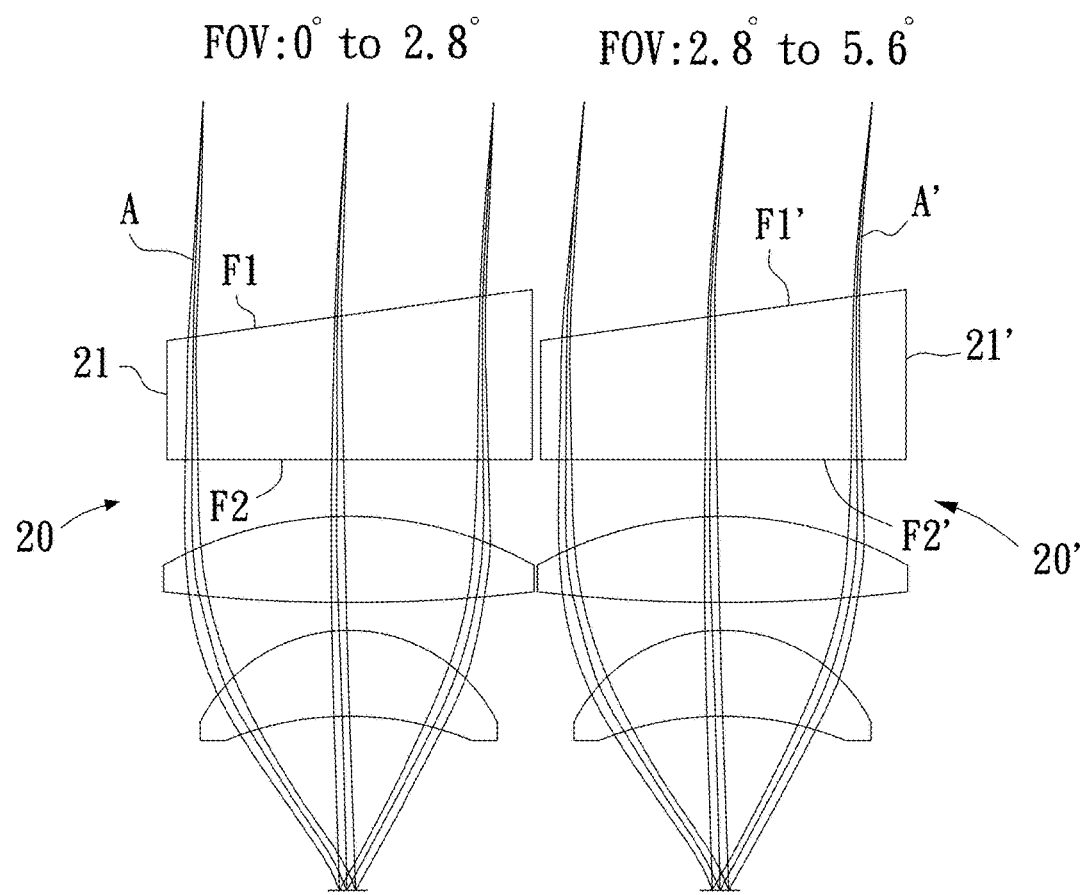
FIG. 2 is a schematic view of a combination of two laser radar detection units according to an embodiment of the present invention.

Referring to FIG. 2, two laser radar detection units 20, 20' are provided. The light admitting surface F1 and the light emitting surface F2 of the wedge-shaped lens 21 of the laser radar detection unit 20 have an included angle $\theta_1$, thereby receiving the first laser reflecting beam A with an FOV of 0°~2.8°. The light admitting surface F1' and the light emitting surface F2' of the wedge-shaped lens 21' of the laser radar detection unit 20' have an included angle $\theta_2$, thereby receiving the first laser reflecting beam A' with an FOV of 2.8°~5.6°. Therefore, the laser radar detection units 20, 20' are combined to achieve an FOV of 5.6°. Therefore, a user can arrange and stack a plurality of laser radar detection units in the horizontal direction and vertical direction to achieve the FOV which meets the system requirements.

Figure 3:
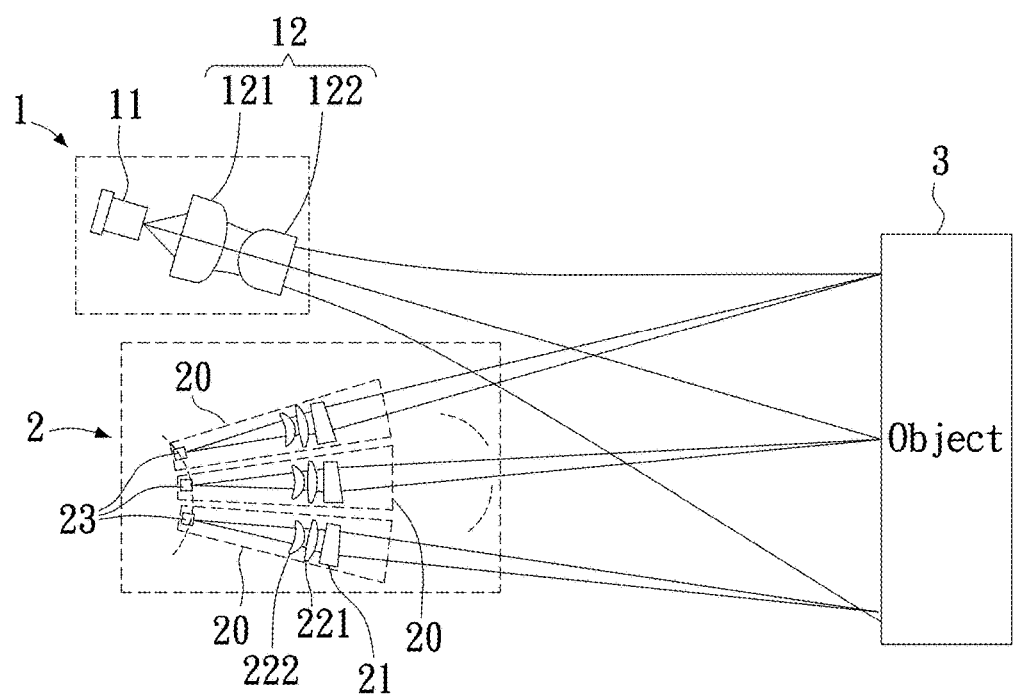
FIG. 3 is a schematic view of a laser radar device according to an embodiment of the present invention.

Referring to FIG. 3, there is shown a schematic view of a laser radar device according to an embodiment of the present invention. As shown in the diagram, the laser radar device consists of two optical sub-systems, namely a laser projecting system 1 and a laser radar detecting system 2. The main purpose of the laser projecting system 1 is to provide an incident laser beam, adjust the beam shaping of the incident laser beam, and project it onto an object 3. The main purpose of the laser radar detecting system 2 is to receive the laser reflecting beam reflected off the object 3.

Figure 4:
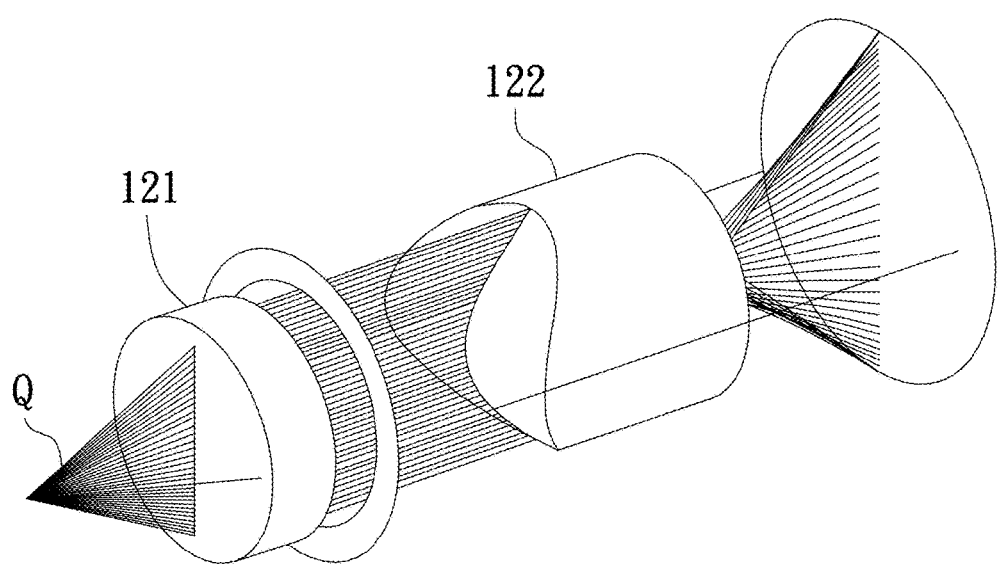
FIG. 4 is a schematic view of a light source orientation adjustment unit according to an embodiment of the present invention.

The laser projecting system 1 comprises a laser diode 11 and a light source orientation adjustment unit 12. The laser diode 11 emits a first incident laser beam Q. The light source orientation adjustment unit 12 comprises a collimating lens 121 and a Powell lens 122 to modulate the angle at which the first incident laser beam Q is projected onto the object 3. Referring to FIG. 4, the first incident laser beam Q emitted from the laser diode 11 is collimated by the collimating lens 121 to form a parallel beam. Then, the parallel beam passes through the Powell lens 122 to form a light source with a divergence angle of ±Z°.

Referring to FIG. 3, the laser radar detecting system 2 comprises L laser radar detection units 20 and a processing module (not shown). Each laser radar detection unit 20 comprises the same components as described before and therefore is not described hereunder for the sake of brevity.

The laser radar detection units 20 are disposed in the horizontal direction and vertical direction of the object 3, respectively. The L laser radar detection units 20 are arranged in the form of M (N×N) laser radar detecting modules in a manner that allows each laser radar detecting module to have N laser radar detection units 20 in the horizontal direction and N laser radar detection units 20 in the vertical direction. Therefore, not only laser reflecting beams in different regions are received by their respective optical detectors 23, but each laser radar detecting module also has a vertical FOV of ±X° and a horizontal FOV of ±Y°, allowing the laser radar detecting modules to be stacked in a manner that attains the FOV required for the system. Furthermore, to allow the laser projecting system 1 and the laser radar detecting system 2 of the laser radar device to have the same FOV, the included angle θ between the light admitting surface F1 and the light emitting surface F2 of the wedge-shaped lens 21 of the laser radar detection unit 20 in the horizontal direction is designed with a view to controlling the angle at which the laser reflecting beam falls on the optical detector 23.

Figure 5:
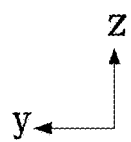
FIG. 5 is a schematic view of a stacking framework of a quarter of a laser radar detecting system according to an embodiment of the present invention.
Figure 5:
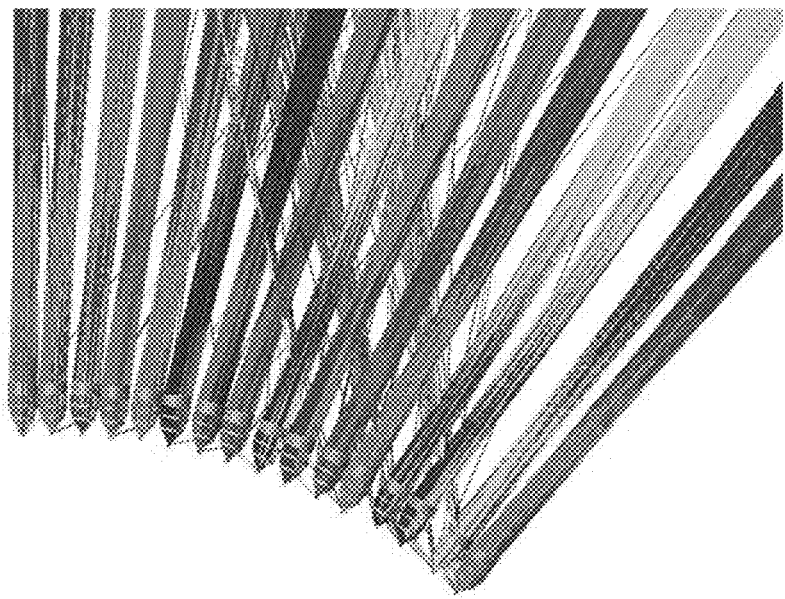

For example, if the first incident laser beam Q emitted from the laser projecting system 1 passes through the Powell lens 122 to form a laser beam with an FOV of ±45° in the horizontal direction and an FOV of ±2.8° in the vertical direction, it is feasible to allow the laser radar detecting system 2 and the laser projecting system 1 to have the same FOV by changing the included angle θ between the light admitting surface F1 and the light emitting surface F2 of the wedge-shaped lens 21, so as to control the angle at which the laser reflecting beam falls on the optical detector 23, and, as a consequence, the laser projecting system 1 has an FOV of 0~±45° in the horizontal direction, as shown in FIG. 2. Therefore, the laser radar detection units 20, 20' are combined to achieve an FOV of 5.6° in the horizontal direction. Similarly, the identical laser radar detection units 20, 20' are combined to achieve an FOV of ±2.8° in the vertical direction. In doing so, it is feasible to effectuate one (2×2) laser radar detecting module, with a horizontal FOV of 5.6° and a vertical FOV of ±2.8°. Afterward, given the stacking characteristics of the laser radar detecting modules, it is feasible to stack a plurality of (2×2) laser radar detecting modules to achieve a horizontal FOV of ±45°; in other words, by stacking 16 (2×2) laser radar detecting modules across a curved surface, it is feasible to meet the system requirements, as shown in FIG. 5, which shows a ¼ of the laser radar detecting system 2.

The laser radar detection units each convert, through its corresponding optical detector, a received laser beam into an electrical signal. The laser radar device further comprises a processing module (not shown) for analyzing the electrical signal. The processing module is a computer (not shown).

Therefore, according to the present invention, by designing optical parameters of a wedge-shaped lens of a single laser radar detection unit, stacking laser radar detection units in the horizontal direction and vertical direction, and arranging the laser radar detection units in the form of laser radar detecting modules to meet the requirements of a laser radar device, it is feasible to facilitate overall laser radar device manufacturing and processing, meet R&D needs, and adjust an optical system in its entirety easily.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A laser radar detection unit, comprising:
   a wedge-shaped lens for receiving a first laser reflecting beam and transmitting a second laser reflecting beam;
   an aspherical lens system for receiving the second laser reflecting beam and converting the second laser reflecting beam into a third laser reflecting beam by convergence; and
   an optical detector for detecting the third laser reflecting beam and converting the third laser reflecting beam into an electrical signal.

2. The laser radar detection unit of claim 1, wherein the wedge-shaped lens comprises:
   a light admitting surface for receiving the first laser reflecting beam;
   a light transmitting surface opposite the light admitting surface and adapted to transmit the second laser reflecting beam;
   a first lateral plane; and
   a second lateral plane having a smaller thickness than the first lateral plane, wherein lengthwise shape of the light admitting surface is asymmetrical about an optical axis of the wedge-shaped lens, and lengthwise shape of the light transmitting surface is symmetrical about the optical axis of the wedge-shaped lens.

3. A laser radar device, comprising:
   a laser projecting system for projecting a first incident laser beam onto an object; and
   a laser radar detecting system comprising at least two laser radar detection units disposed in a horizontal direction and a vertical direction of an object, respectively,
   wherein the laser radar detection units each comprise:
   a wedge-shaped lens for receiving a first laser reflecting beam reflected off the object and transmitting a second laser reflecting beam;
   an aspherical lens system for receiving the second laser reflecting beam and converting the second laser reflecting beam into a third laser reflecting beam by convergence; and
   an optical detector for detecting the third laser reflecting beam and converting the third laser reflecting beam into an electrical signal.

4. The laser radar device of claim 3, wherein the laser projecting system comprises:
   a laser diode for emitting the first incident laser beam; and
   a light source orientation adjustment unit comprising a collimating lens and a Powell lens to modulate an angle at which the first incident laser beam is projected onto the object.

5. The laser radar device of claim 3, wherein the wedge-shaped lens comprises:
   a light admitting surface for receiving the first laser reflecting beam;
   a light transmitting surface opposite the light admitting surface and adapted to transmit the second laser reflecting beam;
   a first lateral plane; and
   a second lateral plane having a smaller thickness than the first lateral plane, wherein lengthwise shape of the light admitting surface is asymmetrical about an optical axis of the wedge-shaped lens, and lengthwise shape of the light transmitting surface is symmetrical about the optical axis of the wedge-shaped lens.

6. The laser radar device of claim 4, wherein the wedge-shaped lens comprises:
   a light admitting surface for receiving the first laser reflecting beam;
   a light transmitting surface opposite the light admitting surface and adapted to transmit the second laser reflecting beam;
   a first lateral plane; and
   a second lateral plane having a smaller thickness than the first lateral plane, wherein lengthwise shape of the light admitting surface is asymmetrical about an optical axis of the wedge-shaped lens, and lengthwise shape of the light transmitting surface is symmetrical about the optical axis of the wedge-shaped lens.

7. The laser radar device of claim 3, wherein the laser radar device further comprises a processing module for analyzing the electrical signal.

8. The laser radar device of claim 7, wherein the processing module is a computer.

9. The laser radar device of claim 4, wherein the laser radar device further comprises a processing module for analyzing the electrical signal.

10. The laser radar device of claim 9, wherein the processing module is a computer.

11. The laser radar device of claim 5, wherein the laser radar device further comprises a processing module for analyzing the electrical signal.

12. The laser radar device of claim 11, wherein the processing module is a computer.

13. The laser radar device of claim 6, wherein the laser radar device further comprises a processing module for analyzing the electrical signal.

14. The laser radar device of claim 13, wherein the processing module is a computer.

* * * * *